US008386324B2

(12) United States Patent
Lin

(10) Patent No.: US 8,386,324 B2
(45) Date of Patent: Feb. 26, 2013

(54) DISTRIBUTED MANAGEMENT SERVICE FOR AN AUTO-IDENTIFICATION SYSTEM

(75) Inventor: Tao Lin, Palo Alto, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1940 days.

(21) Appl. No.: 11/025,133

(22) Filed: Dec. 30, 2004

(65) Prior Publication Data

US 2006/0149566 A1 Jul. 6, 2006

(51) Int. Cl.
*G07B 15/02* (2006.01)

(52) U.S. Cl. ........................................................ 705/22

(58) Field of Classification Search .................... 705/22, 705/28, 14, 1

See application file for complete search history.

(56) References Cited

U.S. PATENT DOCUMENTS 5,960,085 A * 9/1999 de la Huerga ................ 340/5.61
6,375,038 B1 * 4/2002 Daansen et al. ................ 222/52
6,900,731 B2 * 5/2005 Kreiner et al. ............. 340/572.1
6,954,148 B2 * 10/2005 Pulkkinen et al. .......... 340/572.1
6,982,639 B2 * 1/2006 Brackett et al. .......... 340/539.13
7,145,457 B2 * 12/2006 Spitz et al. ................. 340/572.1
7,172,113 B2 * 2/2007 Olenick et al. ................ 235/380
7,240,023 B1 * 7/2007 Powell ............................ 705/14
7,305,278 B2 * 12/2007 Enright et al. ................ 700/115
7,327,251 B2 * 2/2008 Corbett, Jr. .............. 340/539.13
7,376,601 B1 * 5/2008 Aldridge ......................... 705/28
2001/0016827 A1 * 8/2001 Fernandez ...................... 705/14
2003/0163376 A1 * 8/2003 Inoue et al. ..................... 705/14
2003/0222762 A1 * 12/2003 Beigl et al. ................... 340/5.92
2004/0024644 A1 * 2/2004 Gui et al. ........................ 705/22
2005/0099288 A1 * 5/2005 Spitz et al. .................... 340/506
2005/0171787 A1 * 8/2005 Zagami ............................. 705/1
2006/0185605 A1 * 8/2006 Renz et al. ................. 119/51.02
2007/0119926 A1 * 5/2007 Sloan et al. ................... 235/384
2008/0030330 A1 * 2/2008 Vock et al. ................. 340/568.1

* cited by examiner

*Primary Examiner* — Seye Iwarere
(74) *Attorney, Agent, or Firm* — Fish & Richardson P.C.

(57) ABSTRACT

An auto-identification system is described that includes a plurality of distributed auto-id nodes that are operable to track physical objects as they move through an operation of an enterprise, such as, for example, a supply chain network or a sales network. The auto-id nodes are distributed across sites of the network, and are in communication with enterprise application systems and/or data acquisition systems such as RFID readers or sensor devices. By focusing on their respective sites, the auto-id nodes minimize the amount of data tracked by their respective enterprise applications. Further, a distributed management service may be in communication with all of the auto-id nodes, so as to distribute rules governing the operation of the enterprise to at least one of the auto-id nodes. The distributed management service may be used for, for example, generating and updating new rules, distributing the rules into the local auto-id nodes, and operating the rules for handling the data collected from different auto-id nodes.

21 Claims, 8 Drawing Sheets

DISTRIBUTED MANAGEMENT SERVICE FOR AN AUTO-IDENTIFICATION SYSTEM

TECHNICAL FIELD

This description relates to automatic identification of physical objects.

BACKGROUND

Auto-identification (auto-id) systems are used, for example, to identify or otherwise obtain information about products that are to be manufactured, bought or sold, or otherwise used in commerce. For example, information regarding a physical object, such as a box in a backroom, may be stored in association with a tag or other identifier that is affixed to the box, and/or an object tagged with a unique identifier may be located on a shelf in a retail store. Then, some sort of device, such as a reader or sensor, may be used to identify the physical objects, using the identifier, and thereby determine, capture, and use the information stored in a computer system with respect to the box or the object, such as, for example, a brand name of the object or an expiration date of the object.

One example of an auto-id system is known as a Radio-Frequency Identification (RFID) system. RFID generally refers to technologies in which a unique number (and/or other identifying information) is stored on a microchip that is associated with an antenna within an RFID tag or transponder. A reader is used to communicate with the antenna and obtain the unique number from the microchip, and thereby obtain information associated with the unique number. Advantageously, RFID is fast and wireless, does not require a direction or line-of-sight to enable communication between readers and tags, and reduces or eliminates the need for human data entry. As a result, RFID may be used in many applications, such as, for example, identification of tagged objects within stores or warehouses, automatic payment of tolls by cars with RFID tags, and/or identification of authorized personnel for entry into a restricted area.

Many other types of auto-id system devices exist. Examples include 2D bar code scanners, smart card devices/readers, voice recognition systems, optical character recognition systems, and biometric systems (e.g., retinal and fingerprint scans). Many or all such systems have the ability or the potential to reduce costs, increase efficiency, improve data accuracy, provide data with more granularity (even down to the single item/object level), and thereby improve customer satisfaction within the operations of an enterprise system.

SUMMARY

According to one general aspect, a system includes a plurality of auto-id nodes, each at one of a plurality of sites of an enterprise and each associated with at least one tracking device that is operable to track events associated with physical objects that are associated with an operation associated with the enterprise, and a distributed management service in communication with the auto-id nodes and operable to distribute rules governing the operation of the enterprise to at least a first one of the auto-id nodes, for execution at the auto-id node, based on the events.

Implementations may include one or more of the following features. For example, the system may include a rule monitor that is operable to monitor the events and thereby the operation associated with an auto-id network, wherein the rules are designed at least partially based on monitoring results of the rule monitor. In this case, the rule monitor may be operable to query at least one of the auto-id nodes for event data related to a process of the at least one auto-id node, so as to obtain the monitoring results in response to the query. Also, the system may include a learning engine that is operable to generate or modify the rules, based on the monitoring results.

The system may include a rule distributor that is operable to distribute the rules to the first auto-id node within a modular rule set. In this case, the rule monitor may be operable to monitor execution of the rules at the first auto-id node for inclusion in the monitoring results, and the rule distributor may be operable to distribute the rules to a second one of the auto-id nodes, based on the monitoring results. Also, the rule distributor may be operable to access event data related to a process of the second auto-id node, and may be further operable to distribute the rules to the second auto-id node based on the event data.

The rules may be formulated as a business process model governing the operation associated with the enterprise. The tracking devices may include an auto-id reader or an environment sensor device.

According to another general aspect, rules for governing an operation associated with a physical object and an enterprise are determined, the rules are distributed to a first one of a plurality of auto-id nodes, each of the auto-id nodes being associated with a tracking device that generates events based on a use of the physical object within the operation, and the rules are executed within the first auto-id node, based on the events.

Implementations may include one or more of the following features. For example, determining the rules may include monitoring the events and thereby the operation associated with the enterprise, and designing the rules at least partially based on monitoring results of the monitoring. In this case, monitoring the events may include querying at least one of the auto-id nodes for event data related to a process of the at least one auto-id node, so as to obtain the monitoring results in response to the query.

Also, distributing the rules may include distributing the rules to the first auto-id node within a modular rule set. In this case, execution of the rules may be monitored at the first auto-id node for inclusion in the monitoring results, and the rules may be distributed to a second one of the auto-id nodes, based on the monitoring results. Further, event data related to a process of the second auto-id node may be accessed, and the rules may be distributed to the second auto-id node, based on the event data.

According to another general aspect, an apparatus has a storage medium with instructions stored thereon, and the instructions include a first code segment for determining rules for governing an operation associated with a physical object and an enterprise, a second code segment for distributing the rules to a first one of a plurality of auto-id nodes, each of the auto-id nodes being associated with a tracking device that generates events based on a use of the physical object within the operation, and a third code segment for executing the rules within the first auto-id node, based on the events.

Implementations may include one or more of the following features. For example, the first code segment may include a fourth code segment for monitoring the events and thereby the operation associated with the enterprise, and a fifth code segment for designing the rules at least partially based on monitoring results of the monitoring.

In this case, the fourth code segment may include a sixth code segment for querying at least one of the auto-id nodes for event data related to a process of the at least one auto-id node, so as to obtain the monitoring results in response to the query.

Additionally, or alternatively, the instructions may include a sixth code segment for monitoring execution of the rules at the first auto-id node for inclusion in the monitoring results, and a seventh code segment for distributing the rules to a second one of the auto-id nodes, based on the monitoring results. In this case, the instructions also may include an eighth code segment for accessing event data related to a process of the second auto-id node, and a ninth code segment for distributing the rules to the second auto-id node based on the event data.

The details of one or more implementations are set forth in the accompanying drawings and the description below. Other features will be apparent from the description and drawings, and from the claims.

DETAILED DESCRIPTION

Figure 1:
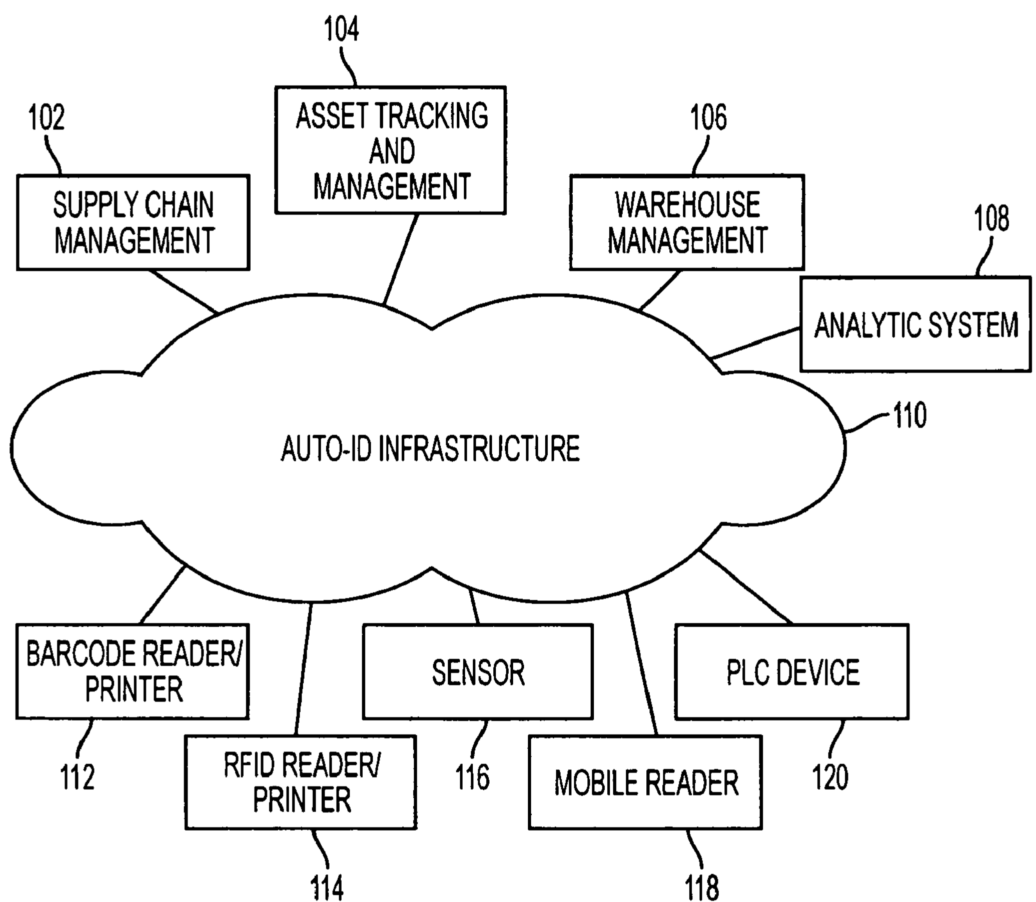
FIG. 1 is a network diagram of an auto-id system.

FIG. 1 is a network diagram of an auto-id system 100. In FIG. 1, a plurality of enterprise applications include, as examples, a supply chain management application 102, which may be used by the enterprise to oversee the process of producing/buying, shipping, and selling of the products or services of the enterprise. An asset tracking and management system 104 may be used, for example, to monitor and track a number of assets within or across a site, an organization, or across organizations, in order to determine what assets, e.g., inventory assets, are available or unavailable to, or desired by, the enterprise. A warehouse management application 106 may be used to oversee the receiving, stocking, selection, and shipping aspects of a warehouse. An analytic system 108 may be used to quantify aspects of the operations of the enterprise, such as, for example, speed of response to consumer requests, loss resulting from theft, or other factors that may impact a profit or operation of the enterprise.

The examples of enterprise applications illustrated in FIG. 1 illustrate the need of an enterprise to gather, share, and use data that is common to the enterprise systems. For example, the supply chain management application 102 may need to know how much of a certain type of asset is currently available, based on data within the asset management application 104. The analytic system 108 may extract data from the auto-id middleware and also from the other applications 102, 104, or 106, in order, for example, to discover performance issues (such as storage usage, or reasons for delivery delay), problems (such as product counterfeit patterns), and the general visibility of the physical object (item, case, pallet). The analytic system 108 may report the discovered results through a portal system.

Much of the data to be shared and used by enterprise applications, such as, for example, those just described, relates to the products or services that are bought and/or sold by the enterprise systems. In FIG. 1, information regarding theses products or services is obtained by the applications through the use of a middleware infrastructure 110, which implements an auto-identification (auto-id) system for automatically obtaining and sharing information related to the products and services to be bought and/or sold.

Generally, auto-id systems, as referred to above, enable the automatic gathering and use of information related to products sold or used by the enterprise, and include identifiers and readers for obtaining information about the identifiers. In FIG. 1, examples of auto-id elements include a barcode reader/printer 112, which may be used to read or print barcode labels (to be) attached to an object. An RFID reader/printer 114 is shown, which, as should be understood from the above discussion of RFID systems, may be used to read information from, or assign information to, an RFID tag attached to an object. A sensor 116 may refer to, for example, an environmental sensor (e.g., a thermometer), or a voice or an optical character recognition sensor. A mobile reader 118 refers, as its name implies, to a reader that may be carried by a user for detecting, for example, an RFID tag or other auto-id identifier. Finally in FIG. 1, a Programable Logic Controller (PLC) device represents a digital controller used for applications such as on/off control, timing, logic, counting and sequencing, and also may be controlled by a device controller system, described in more detail below.

As shown in FIG. 1, then, information obtained by any of the auto-id devices/systems 112-120 may be communicated to, shared between, and used by, any of the enterprise applications 102-108. In this way, the enterprise may obtain and use information that is essentially real-time, across an entire spectrum of its operations. Further, the enterprise may share information with other enterprises. For example, the supply chain management application 102 may be associated with a first enterprise (e.g., a retail store), while the warehouse management application may be associated with a second enterprise (e.g., a manufacturer). By obtaining information from the auto-id devices/systems 112-120, and sharing this and other information across the middleware infrastructure 110, the two enterprises may increase an efficiency of both of their respective operations.

Figure 2:
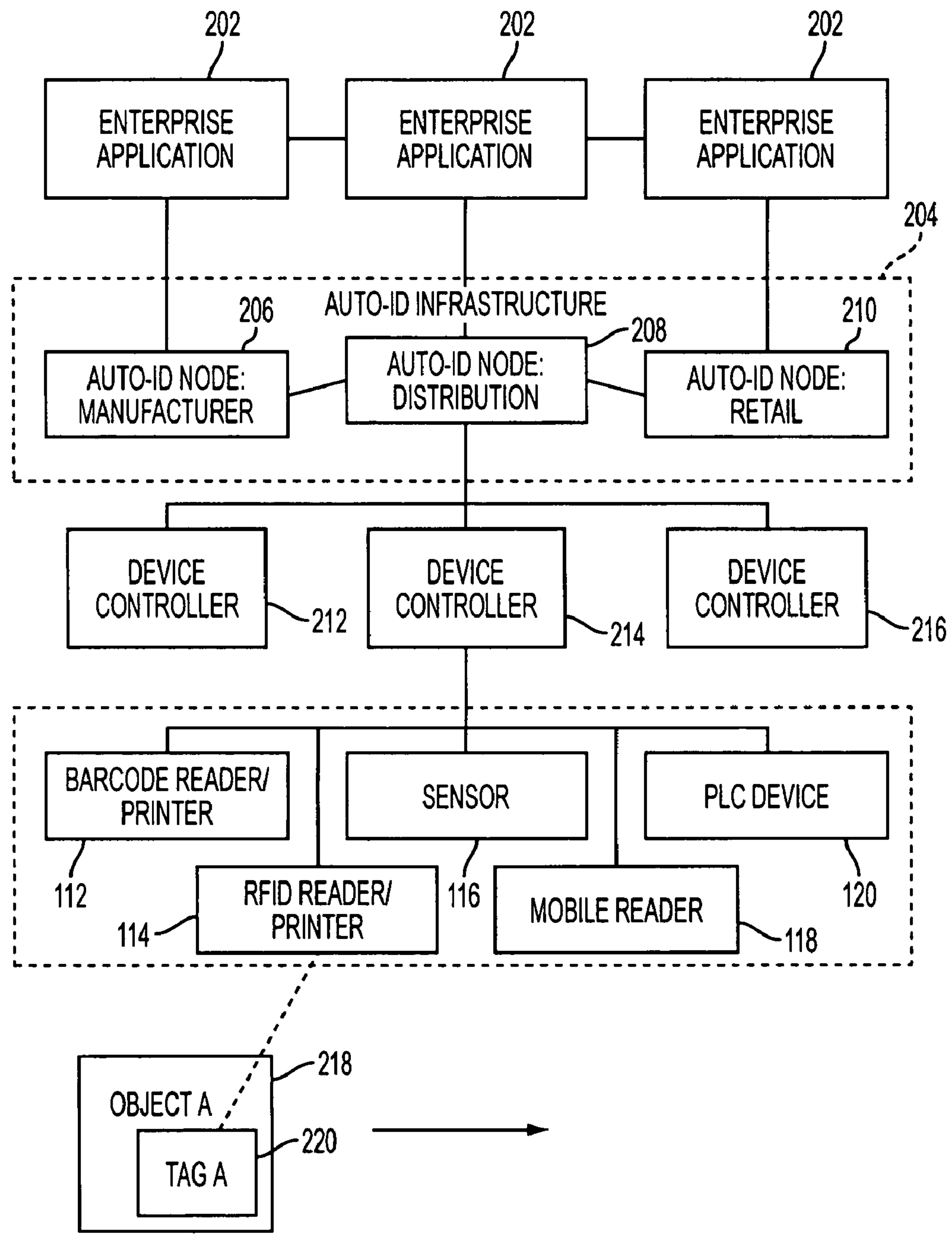
FIG. 2 is a block diagram of a system illustrating examples of the auto-id features of FIG. 1, including an auto-id infrastructure having an auto-id node(s) and a device controller(s).

FIG. 2 is a block diagram of a system 200 illustrating examples of the auto-id features of FIG. 1. In FIG. 2, enterprise applications 202 may include the various applications 102-108 discussed above, as well as various other enterprise applications.

An auto-id infrastructure 204 represents some or all of the middleware infrastructure 110 of FIG. 1. In particular, the auto-id infrastructure 204 includes auto-id nodes 206, 208, and 210. The auto-id nodes 206, 208, and 210 generally represent nodes at defined locations that are designed to associate information obtained by the auto-id devices 112-120 with existing business logic or data. Further, the auto-id nodes 206, 208, and 210 may be used to store historical information for products or objects that have been tracked by the auto-id devices/systems 112-120. Such historical information may include, for example, status information at a particular time, object location, environmental information related to the tracked object(s), and information for multiple objects that has been collected and combined for a desired purpose.

The auto-id nodes 206, 208, and 210 may be strategically placed throughout the enterprise, or across multiple enterprises. For example, the auto-id node 206 may be located at a manufacturing site, while the auto-id node 208 may be located at a product distribution site, and the auto-id node 210 may be located at a retail store. In this way, information that is particular to an actual setting of an auto-id node may be obtained and retained only at that particular node.

For example, the auto-id node 210 at a retail store may be interested in tracking a retail price of an item, or a number of items on a shelf of the retail store. Such information may not be useful to the auto-id node 206 at a manufacturing location, but may be partially useful to the auto-id node 208 at the distribution location. For example, the auto-id node at the distribution location 208 may not be interested in the retail price of an item, but may be interested in a number of presently-shelved items (for purposes of re-stocking).

Similarly, business processes and business logic at the different sites may benefit from the use of the localized auto-id nodes 206, 208, and 210. For example, the retail auto-id node 210 may include a workflow for preventing theft of objects, while the manufacturing auto-id node 206 may be interested in monitoring a quantify of objects produced in a particular time period. Thus, by using a dispersed network of localized auto-id nodes, the system 200 may process information more efficiently, and in a manner that is more useful to the users at the various locations.

Each auto-id node in the system 200 generally includes one or more device controllers, illustrated in FIG. 2 as device controllers 212, 214, and 216, which are associated with the distribution auto-id node 208. Of course, each of the auto-id nodes 206, 208, and 210 may have fewer or greater numbers of device controllers, or may not use device controllers at all.

Referring to the device controller 214 as an example, FIG. 2 illustrates that the device controller 214 may be used to oversee and coordinate the operation of some or all of the auto-id devices 112-120. Of course, the device controllers 212 and 216 may be used to oversee the operations of similar auto-id devices that may be connected to those device controllers.

More specifically, the device controller 214 may be used to process data from the auto-id devices 112-120, so as to increase an efficiency of its associated auto-id node 208. For example, the device controller may remove extraneous information, or may combine or modify data in a manner specified by the auto-id node 208 in a way that is useful to the distribution function of that auto-id node, and/or in a way that is useful to the enterprise applications 202.

Thus, the device controller 214 coordinates and manages the auto-id devices 112-120, perhaps based on instructions from the auto-id node 208, and relays (processed) information from the auto-id devices to the auto-id node 208. For example, the auto-id node 208 may be used to instruct the device controller 214 to obtain a particular class of data (such as, for example, quantity) with respect to an object 218 (for example, a toy or other item to be distributed to retailers for sale). Then, the device controller 214 may use the RFID reader/printer 114 to obtain this information from a tag 220 associated with the object 218, and may then remove any undesired information that is concurrently obtained before passing on the information that a certain number of the object in question is available to the auto-id node 208.

As another example, the auto-id node 208 may instruct the device controller 214 to assign information to the object 218. For example, the device controller 214 may use the RFID reader/printer 114 to change a current price of the object 218 (e.g., to store new price information on, or in association with, the RFID tag 220 attached to a certain class of object).

From FIG. 2, it should be understood that, just as each of the device controllers 212, 214, and 216 may be used to filter, aggregate, write, or otherwise manipulate data with respect to all of its associated auto-id devices and/or environment devices 112-120, the auto-id node 208 is operable to filter, aggregate, assign, or otherwise manipulate data for its associated device controllers 212, 214, and 216. In this way, the auto-id node 208 may integrate information from its device controllers 212, 214, and 216 with business processes that may be operational on one or more of the enterprise applications 202.

By extension, it may be seen that the enterprise applications 202 are operable to aggregate information from all of the auto-id nodes 216, 218, and 210. Further, it should be understood that information that is useful at one level of the system 200 may not be as useful at another level. For example, the enterprise applications 202 may not be interested in, or able to use, low-level (e.g., item-level) information that is collected by the reader/printer 114. Rather, the enterprise applications 202 may only be interested in that information to the extent that the information is filtered and/or aggregated by the device controller 214 and/or the auto-id node 208.

As a result of the described architecture, it should be understood that business logic from the enterprise application 202, and/or from multiple enterprise applications, may be supported in the auto-id middleware 110. Further, such multiple enterprise applications may be supported with a single physical hardware system and a single auto-id middlware that are common to all of the enterprise applications.

Figure 3:
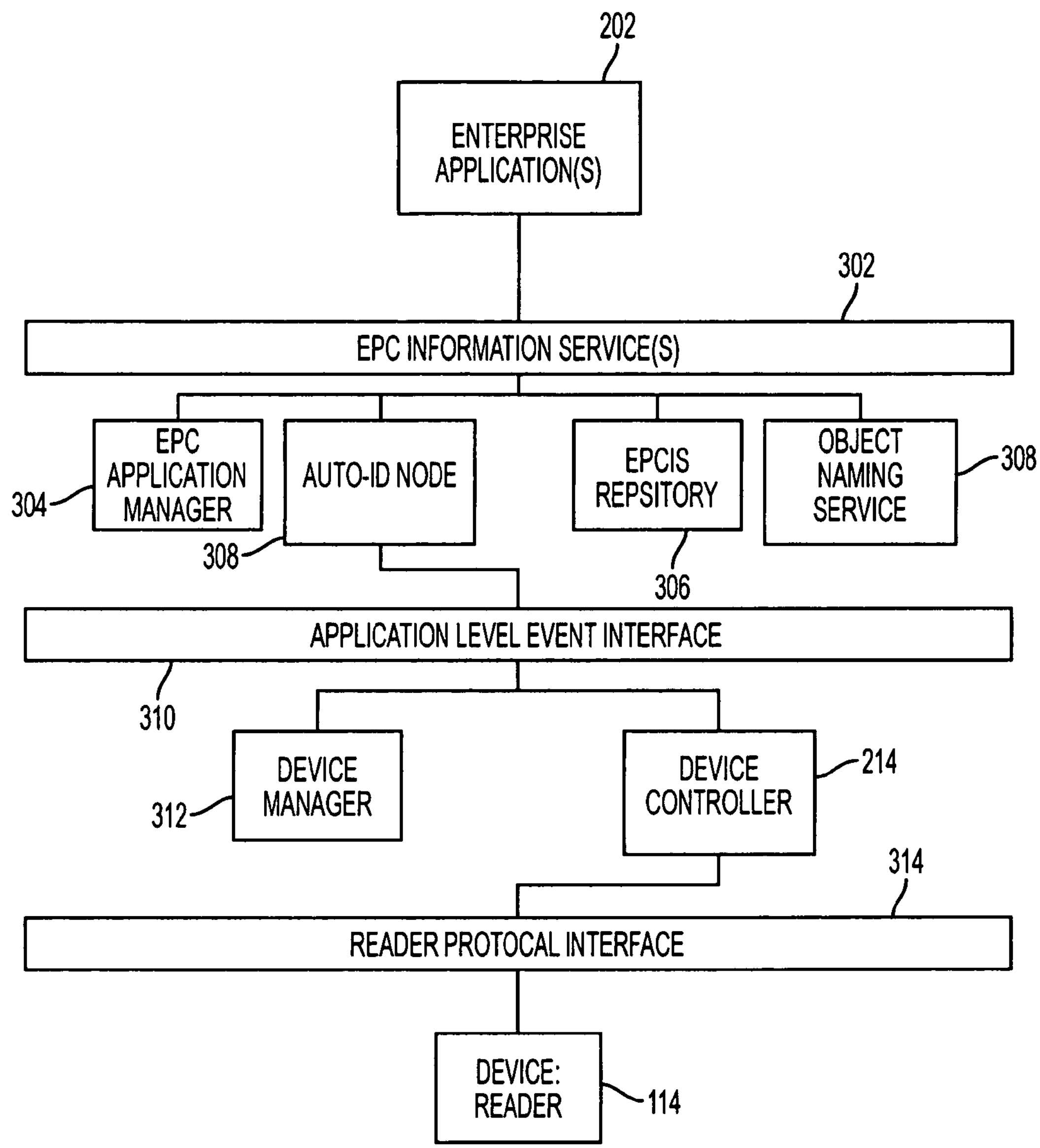
FIG. 3 is a block diagram of a network architecture for use with the auto-id infrastructure of FIG. 2.

FIG. 3 is a block diagram of a network architecture 300 for use with the auto-id infrastructure 204 of FIG. 2. More specifically, FIG. 3 illustrates an architecture by which the auto-id infrastructure 204 of FIG. 2 may be used with an Electronic Product Code (EPC) that has been developed for use with auto-id systems.

The EPC refers to a unique number, similar to a Uniform Product Code (UPC) identifier, that has a pre-defined format and scheme which multiple organizations and enterprises have agreed to use in uniquely designating and identifying their respective products, goods, or services, or collections thereof (e.g., pallets, cases, or truck-loads). In the context of RFID systems, then, the EPC may be assigned to the tag 220 on the object 218 of FIG. 2. A classic EPC, for example, is defined by four fields: header field (to distinguish different formats), manufacture field (each organization that assigns the EPC has its own manufacture field), product field (product code), and serial number (with the product).

In FIG. 3, an EPC Information Services (EPCIS) layer 302 allows the exchange of EPC data over a network. That is, EPCIS provides a standard format or protocol by which a reader that has identified an EPC number may find and use information about that number (and hence, about its associated item). In some implementations, and/or in related implementations, a language such as, for example, the Physical Mark-up Language (PML) and/or the eXtensible Mark-up Language (XML) may be used for the above-described transfer and use of business-level EPC information The EPCIS layer 302 receives information from an application manager 304, which is generally operable to oversee information events (e.g., tag reads) and manage the events for communication to the EPCIS layer 302 and thereby to an EPCIS repository 306. The application manager 304 operates to monitor and configure the repository 306 as the repository 306 accumulates data over relatively long periods of time during which the data may not be immediately useful to any particular application or device. Generally speaking, a flow of information for a number of objects may be too great for the repository 306 to be practically useful in real-time, particularly given potential network delays. Rather, the auto-id node 208 of FIG. 2 may be used to track such information, perhaps for some fixed period of time, that may be immediately useful to the auto-id node 208.

The application manager 304 and EPCIS layer 302 have access to an Object Naming Service (ONS), which, similarly to a Domain Name Service (DNS), is a look-up service that allows the application manager 304 and EPCIS layer 302 to find information about a product, based on the EPC code for that product. The ONS 308 may have different levels of information, which may be classified, for example, by whether the information is stored locally or non-locally to the product.

An application level event (ALE) interface layer 310 provides an interface to a device manager 312 and the device controller 214. More specifically, the ALE interface layer 310 may be used to filter or aggregate information events, as received from the device manager 312 and/or the device controller 214. The device manager 312 may be used to manage a status and/or configuration of the device controller 214.

Also in FIG. 3, a reader protocol interface layer 314 provides an interface for the device 114. That is, it should be understood that different enterprises may employ different types of the device 114, or other auto-id devices, and these devices and enterprises may make use of different reader protocols for communicating with the readers. The reader protocol interface 314 is designed to enable communication with all readers within the system 300.

It should be understood from FIG. 3 that the system 300 may be used without the auto-id infrastructure 204 of FIG. 2, and, conversely, the auto-id infrastructure 204 of FIG. 2 may be used without other elements of FIG. 3. Thus, FIG. 3 illustrates that the auto-id infrastructure 204 of FIG. 2 may be used with, but does not require the use of, the EPC network and standard.

Figure 4:
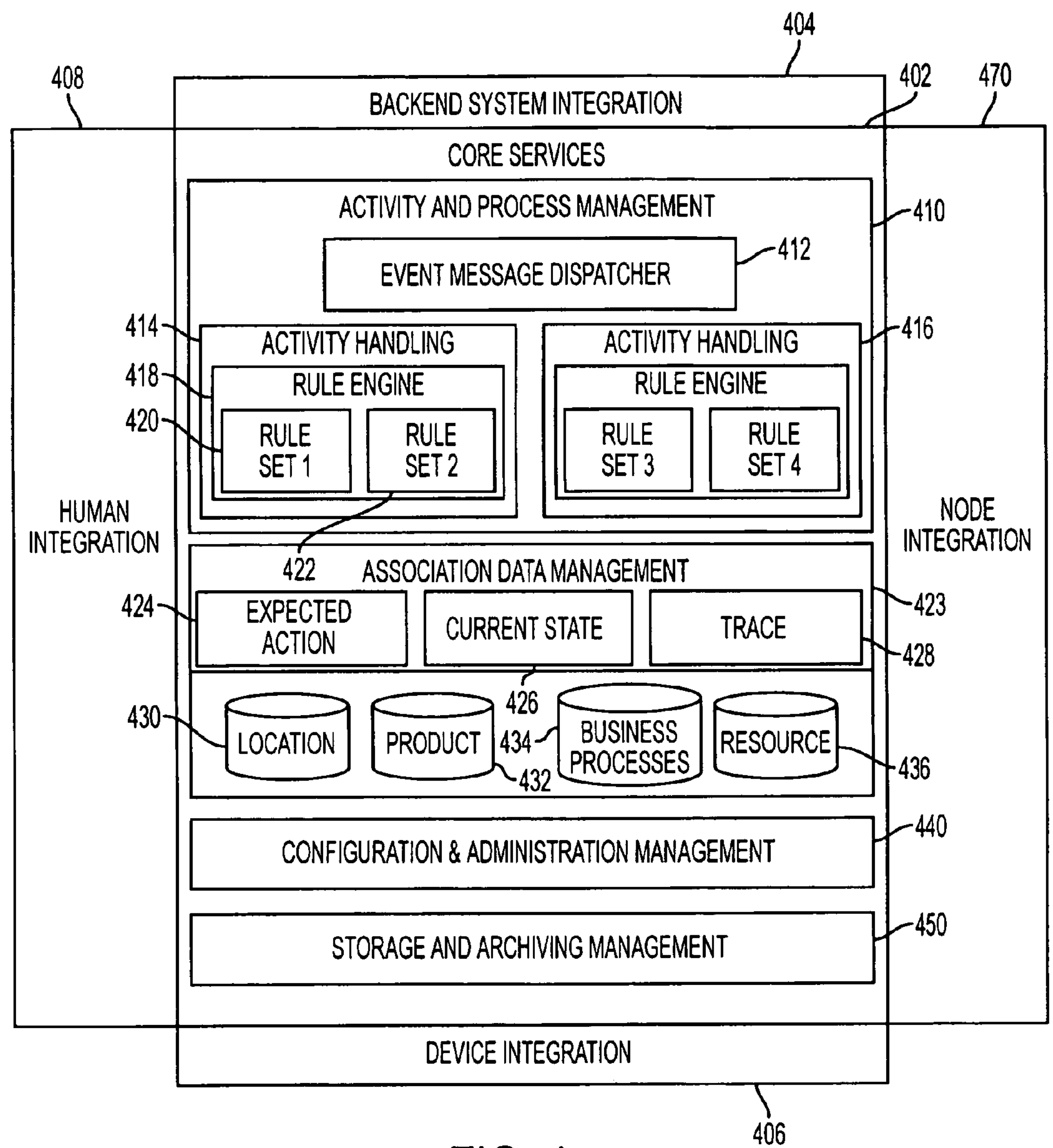
FIG. 4 is a block diagram of the auto-id node(s) of FIGS. 2 and 3.

FIG. 4 is a block diagram of the auto-id node(s) 206, 208, and 210 of FIGS. 2 and/or 3. In FIG. 4, a core services module 402 handles implementation details of, for example, the auto-id node 208, as discussed in more detail below, while various integration modules 404, 406, 408, and 470 handle communication, configuration, and management details of the core services module 402 relative to external features, users, and services.

For example, the backend system integration layer 404 handles communication between the auto-id node 400 and backend systems, such as, for example, the applications 102-108 of FIG. 1, or the application 202 of FIG. 2.

The device integration layer 406 handles communication between the auto-id node 400 and devices. For example, the device integration layer 406 may enable communications between the node 208 and the device controller 214 of FIG. 2. In some implementations the device integration layer 406 may enable communications directly with one or more of the tracking devices 112-118.

The human integration layer 408 handles communication between the auto-id node 400 and user interfaces. For example, an auto-id node operator may configure an auto-id node to perform certain tasks through a user interface, or monitor the information that the auto-id node receives. The operator also may obtain alert messages from the auto-id node in case of, for example, an unexpected event or a malfunction. Further, security of the auto-id node 400 may be monitored, so that only authorized personnel may interact with the auto-id node 400.

The node integration layer 470 handles communication between the auto-id node 400 and other auto-id nodes. For example, multiple neighboring auto-id nodes together may track an object through a distribution or supply chain, in order to provide routing information for the object, or to determine whether additional units of the object should be purchased or stocked.

The core services module 402 includes an activity and process management module 410. The activity and process management module 410 analyzes information associated with an event experienced by an object, such as, for example, a read or tracking event in which tag information is read from (for example) the tag 220 of object 218 by the RFID reader 114 in FIG. 2. Then, the activity and process management module 410 matches this information with known information that is related to the particular object.

For example, as described in more detail below, each tracked object may be associated with one or more business processes, also referred to as, for example, a business process model(s), or a workflow(s). Such processes generally describe all known or anticipated possibilities that may be experienced by an object during some or all of its lifetime, i.e., from manufacturing to distribution, or from distribution to retail sale, or from manufacturing to retail sale. In this sense, the auto-id node may require all of the lifetime information for a particular object, or may require only some sub-set of the lifetime information, depending on the duties of the particular auto-id node 400.

Thus, actual, current event information (e.g., information read from the tag 220 by the reader 114), combined with previously-detected event information, as well as anticipated event information (derived from the relevant business process model), allows the auto-id node 400 to make a determination regarding a status of the tracked object(s). In this way, the auto-id node 400 is able to move an object through a supply chain, or some other business model (e.g., a customer return of merchandise), in an efficient, cost-effective manner, with minimal human intervention or supervision.

The activity and process management module 410 includes an event message dispatcher 412. The event message dispatcher 412 receives events from different sources, where, as referenced above, the term event generally may refer to an occurrence triggered by an activity of, for example, one or more of the tracking devices 112-118 of FIG. 1.

In some implementations, such events may be represented as software/data packets that are received at the event message dispatcher 412 from any number of sources. In addition to the tracking devices 112-118, an event may be received from a local operator by way of the human integration module 408. Events also may be received from, for example, the backend system 404, or from another auto-id node.

These different sources of the events may share a same or similar format in describing the various events. For example, the different sources of events may use a universal event descriptor protocol to describe the event. The event description may include, for example, a designated an object identifier, an event type (e.g., a RFID read event), an event source (e.g., the RFID reader 114), a time stamp, a location of the event source, an event subject identifier, or other information.

As one specific example, the reader device 114 may send an event of type "scanning," from a RFID reader having an id "abcd1234," associated with time "10:23 AM Dec. 21, 2004," and having an object-specific identifier that is unique to the object that was scanned. In this way, events from different sources may be received in the event message dispatcher 412 in a compatible format, so that the event message dispatcher 412 may handle the incoming events in the same or similar manner, regardless of the source(s) of events.

The event message handler 412 analyzes some or all of the information referenced above, or other information, and dispatches the incoming events to one or more activity handlers 414 or 416, accordingly. For example, an event may be dispatched to one of the other activity handlers 414/416 based on the type of the event, (e.g., a device reader event, or a neighboring auto-id node event, or a backend system event), the time of the event (e.g., whether the event is a day time event or a night time event), or virtually any other criteria by which the activity handlers may be delegated to handle the events.

The activity handler 414/416 analyzes the information about an event contained therein, along with any known data that may be associated with the event and accessed when needed, and compares this information with a determined business process(es) associated with the object of the event. In so doing, the activity handler 414/416 operates to determine one or many future actions that should be taken, if any, in response to the event.

Once determined, the future actions may be communicated outside of the auto-id node 400 for execution thereof. For example, the future actions may be communicated through the integration interfaces 404, 406, 408, and/or 470. In this way, for example, a human operator may be required to perform some action, or an alert may be raised, or a separate auto-id node 204, 206, 208 (or back-end enterprise applications 102-108/202, or device 112-120) may be notified of some required activity. The activity handler 414/416 also may update its own status and/or tracking data with respect to the object, in order to reflect the changes represented by the event(s), and to more accurately reflect where the object stands in the business process.

The business process that are associated with the object may be represented in a set of rules, and/or as part of a workflow model that may be associated with the object, and perhaps other objects. For example, a rule may be similar to a conditional clause, stating the different actions to be taken in response to particular conditions or circumstances. That is, a rule may state that if one or more conditions is met with respect to a received event, then one or more action(s) should be taken in response. Types of conditions, decision-making processes, and responsive actions are discussed in more detail below.

To implement such rules, the activity handler 414 includes a rule engine 418 that applies rule sets 420 and 422 to the incoming events at the activity handler 414. The rule engine 418 provides an architecture for programmable rule sets to be applied to events received at the auto-id node 400. The rule engine 418 may, for example, implement a mechanism to search one or more rules in the rule sets 420/422 that may be applied to a received event.

For example, the rule engine may parse the event (that may be formatted in a universal event descriptor protocol, as referenced above), and may calculate and match the selective criteria of each rule set and/or rule to find one or many applicable rule(s). The rule engine 418 also may include a mechanism to execute a rule by activating actions on other parts of the core services 410, and/or communicating action requests on the external modules, users, and services through backend system integration 404, device integration 406, human integration 408 and Node integration 470.

As one example, the event message dispatcher 412 may determine that an incoming event is related to a received shipment of a certain class of devices at a certain location (e.g., a particular docking bay at a warehouse), and may dispatch the event to the activity handler 414, which may be assigned the handling of such events. The activity handler 414 may determine that the event is related to a certain object, and/or has other characteristics (e.g., occurred during a night-time shipment), so as to determine that the rule set 420 within the rule engine 418 is the appropriate rule set to be applied to this type of event. Then, the rule set 420 may be applied to analyze the received event and thereby match a conditional clause of each rule(s) with the information received with respect to the event, along with (possibly) other information, and, if there is a match, may apply the rule to determine the future or expected actions to be taken with respect to the event and the corresponding object.

The rule engine 418 is scalable, so that more rule sets may be added to the rule engine without disruption of its function. Moreover, the rule engine 418 is flexible, so that existing rule sets may be removed or deactivated, for example, at run time or when no longer needed.

The rule set 420 may, for example, be assigned to the activity handler 414/416 by the backend system by way of the backend system integration module 404, or from one of the other interface modules 406, 408, or 470. Rules also may be added from other auto-id nodes, or from the EPCIS repository 306 of FIG. 3, or from some other source. Since the rule sets 420/422 are modular, they may easily be replaced or modified, without disrupting operations of other rule sets.

As referenced above, the rule engine 418 receives an object-specific event and associates the event with a business process, so as to determine a future or expected action, if any, for the object associated with the event. In so doing, the rule engine 418 may have access to additional data that may be helpful in performing the matching operation. In particular, within the core services 402, an association data management module 423 communicates with the activity and process management module 410, and stores (or accesses) data and services that may be useful in the implementation of the rule sets 420 and 422 by the rule engine 418.

For example, the association data management module 424 may work closely with the activity handler 414,416 to keep track of the life cycle of each event object, or a portion thereof, and may update the status of the event objects in real-time, in response to receiving event. For example, the association data management module 423 may include data about the object as it progresses through its lifecycle from, e.g., manufacturing to retail sale, or from a return of the object until the object is re-packaged for retail sale as a refurbished object.

The association data management module 423 generally tracks two classes of data regarding a particular object(s). Specifically, dynamic data refers to data that is changing in time, or that may be expected to change, or that has changed as the associated object moves through time. Conversely, static refers to data that generally is not changing in time, or that is changing only infrequently. Different parameters may be considered to by dynamic or static, depending on the object and business process(es) being tracked. For example, an object's location may be considered dynamic, while an object's color or weight may generally be considered static. However, it is possible for an object's color to change, particularly during a manufacturing process, in which case color may be considered a dynamic quality.

Thus, the dynamic data represents the object as it moves through a defined lifecycle or timeline. For example, dynamic data is generally represented in FIG. 4 as including three components: an expected action 424, a current state 426, and a history 428. The expected action 424 includes the expected future events, or possible future events, for an event. Thus, the current state 426 may include the current state of an event, and the history 428 may include a list of past events experienced by the event objects.

As these components are dynamic, the associated data may be modified in response to events that are received with respect to a particular object. For example, the three components 424, 426, 428 may be updated by the activity handler 414,416 each time an event is received. Specifically, if an event triggers a reception of an object at a loading dock, then the object's current state may be changed from "in transit" in the current state 426 to "received." Then, the previous current state entry may be moved to the history 428, to represent the transit history of the object (e.g., a route traveled during transit). An expected action of "received" in the expected action 424 is re-designated as the current state 426, and the rule engine 414 may use the rule set 420 to determine which of the expected actions still within the expected action 424 should be implemented next (e.g., unloading the object for stocking on store shelves).

The dynamic data may thus be altered at least as often as events are received with respect to a particular object. The number and frequency of events are generally related to a number and availability of readers, so that, in the theoretical limit, an object that is continuously tracked during its lifetime by a large enough number of readers could have dynamic data that changes on a continuous basis.

In contrast, static data is stored within the association data management module 423 within databases or memory that are not generally expected to be required to update on a regular or continuous basis. Rather, the association and data management module 423 may communicate with outside sources to update the static data on a periodic or semi-periodic basis. Accordingly, such static data may not generally be expected to change in response to an event (although this may happen in some circumstances).

For example, a location database 430 may include an address of a loading dock, as well as addresses for possible sources of shipments that arrive at that loading dock. It should be understood that some location information may be considered dynamic (e.g., a current location of an object in transit), while other location information may be considered static (e.g., a manufacturing facility at which a particular object was made). In general, though, the static information will be considered not to change on an event-by-event basis.

Similarly, a product database 432 may include detailed descriptions of the products or objects that are being trackfed, including such descriptions that change, but that, again, do not generally change on an event-by-event basis. The product database 432 may store such information, or may look up the information from an outside source, using, for example, a universal product id (e.g. the EPC code read from the tag 220 of the object 218).

A business process database 434 may include one or more business processes that are associated with the object. As referenced above, a business process may refer to a formalized workflow or progression of tasks/events that is designed to govern a lifetime of an object. For example, a business process model may be formalized for a manufacturing process, or for a distribution process, or for a customer return of defective merchandise process.

In such cases, the business process model may be designed at an abstract level at, for example, the back-end system 202, to govern a lifecycle of multiple objects through an entirety (or large portions) of their respective lifecycles. Then, specific sub-sets or instantiations of the business process model(s) may be implemented or monitored at the auto-id node 400, so that the business process model for a particular object represents the lifecycle and possible (anticipated) events that the object may experience. A particular example of this type of implementation is discussed below with respect to FIG. 6.

In other examples, there may not be a business process model or workflow that is defined at this level, and the rules, the dynamic data, and the static data may implicitly define the business process that will be experienced by the object.

A resource database 436 may include other resources for the event. For example, the resource database 436 may include resources that are available for implementing whatever action is required in response to an event. For instance, if an object is received at a warehouse that requires a special device for transporting the object, then the resource database 436 may store information regarding such a moving device that may be available on the premises of the warehouse. Similar comments apply to other resources that may be useful in the management of objects throughout their lifecycle, so that, generally, whenever the rule engine 418 determines that an action is required, the resource database may be consulted to determine what resources are available for implementing that action.

Although the above implementations are discussed with respect to the division of dynamic data and static data, it should be understood that this division is merely one example. For example, the databases 430-436 may be used to store some or all of the dynamic data in addition to the static data, and, in this case, may simply be updated with the dynamically-changing data more frequently than in the above examples. For instance, to the extent that location data may represent either dynamic or static location information, as referenced above, then it should be understood that the location database 430 may be thought of as containing dynamic and/or static data.

The core services 402 also includes a configuration and administration management module 440 to configure and manage the auto-id node 400. For example, administration management module 440 may allow a user to upload more rule sets 420,422, manage the integration logic with respect to modules 404-408, or establish connections with outside services (e.g., to update the static data storage 430-436).

Finally in FIG. 4, a storage and archiving management module 450 manages the data storage and archiving of the core services module 410. For example, the module 450 may be used to archive data that is used infrequently, or that has not been used for some pre-determined time. In so doing, the module 450 may interact with an external storage site, so as to minimize resources needed at the auto-id node 400.

The above description of FIG. 4 is given with respect to the example of a timeline of a particular object or group of objects, where expected actions of the object(s) are matched with actual events. However, it should be understood that the rules, the timeline(s), and the other criteria may be implemented in terms of other parameters.

For example, rather than being object-specific, the auto-id node may operate with respect to a particular reader, or set of readers. For example, one reader may detect events from a plurality of objects' identifiers, so that the history 428, current state 426, and expected actions 424 may be defined with respect to the reader, and not with respect to any particular object read by that reader.

For instance, a Christmas display may sell many Christmas-related objects, and a reader may be located proximate to the objects to determine when the display is becoming depleted. In this example, the activity handler 414 may handle all activity that occurs with respect to the specific reader, and the rule set 420 may designate parameters for, for example, re-ordering inventory from a back room or from a manufacturer, or for replacing one type of object with another when the first type of object is sold out.

Thus, although the activity and process management module 410 may operate according to a number of different parameters and guidelines, it should be understood from the description and examples contained herein that the activity and process management 410 is operable to determine an expected or future event, and to wait until a corresponding event arrives that matches the expected event. In so doing, the activity and process management module 410 may process a number of events that do not match any expected events, in which case an alarm may be triggered, or, otherwise, no action need be taken.

Figure 5:
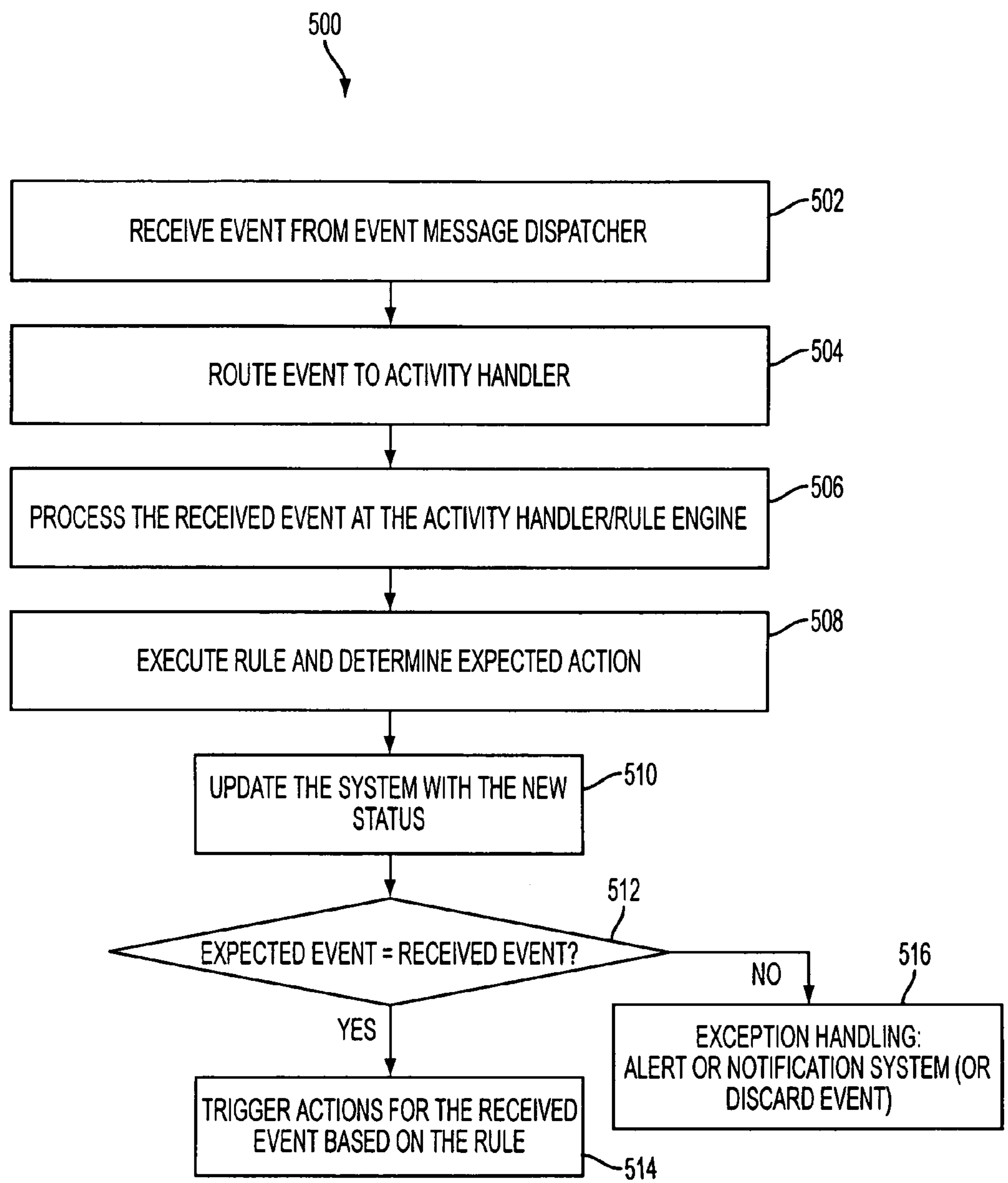
FIG. 5 is a flowchart illustrating a process of the auto-id node of FIGS. 2-4.

FIG. 5 is a flowchart illustrating a process 500 of the auto-id node of FIGS. 2-4, in which an auto-id node processes an event. In FIG. 5, initially, the event message dispatcher 412 receives an event (502) from one of the tracking devices 112-120, or from some other event-generating device. For example, a pallet of soda may arrive at a warehouse of a large retail store and be scanned by the RFID reader 114. An event is then generated that reflects an identify of the object (in this case, the pallet itself, and/or each individual can of soda) in the form of a data packet that is sent to the event message dispatcher 412.

The event message dispatcher 412 then uses information contained within, and/or associated with, the event to find an appropriate activity handler for the event (504). For example, the event message dispatcher 412 may determine that the activity handler 414 handles "receiving" types of events for pallets of soda. The event message dispatcher 412 thus passes the received event to the found activity handler.

The activity handler 414 receives the dispatched event and handles the event with the selected rules, e.g., the rule engine 418 and the rule set 420 (506). Specifically, the rule engine 418 analyzes the information of the event and the associated object so as to find, if any, appropriate rule sets that apply to the received event.

The rule engine 414 then execute the rule(s) 420 for the event, in order to determine the expected actions that should be taken in response to the received event (508). For example, continuing the above example, the rule set 420 may include rules for whether the shipment of soda is to be accepted at the specific warehouse, for stocking therein, or (if, for example, the specific warehouse is already fully stocked with soda) rejected and forwarded to another warehouse that may be short in its soda inventory. To name another example, the reception of the pallet of soda (or some other event) may trigger an end of a business process (at least for the discernable future, or as far as the particular auto-id node 400 is concerned with respect to the object).

The activity handler 414 then updates the auto-id system with the new status of the event (510). For example, a new location of the received object may be updated in both the location database 430 and the product database 432. Also, the business process status for the event may be updated in the expected action 424, current state 426 and history 428. For example, the expected action 424 may be updated with the newly calculated "expected action" from the rule engine 418, and the current state 426 may be updated with the "object received" event as the new current state, and previous state of the object (e.g., "in transit") may be put into the history 428.

The activity handler 418 then determines whether the received event may be matched with a future, expected action (512). If so, the activity handler completes handling the event/action by communicating the event to the related enterprise system, which may trigger more actions/processing in the enterprise system (514).

For example, the activity handler 414 may analyze the expected action 424 for the received object, and may then various criteria to determine whether future action should be taken, e.g., the rule set 420 may determine that: if the expected action for the object includes a stocking action, and if a location matches the received object's location, and if the current time stamp is within a valid time range of the event, and if the receiving warehouse is below expectations for a stocked quantity of soda, then the pallet of soda may be moved through the warehouse and stocked on the appropriate shelf. Of course, there may be more or less criteria than in the above example that is used to compare whether a received event may be matched with an expected action.

Furthermore, there may be one or more expected actions for the received event, in which case, for example, the activity handler 414 may loop through the list of expected actions until an expected action is found or the complete list is checked. For example, if the object is in transit to a final destination, there may be more than one possible transit locations for the shipment. Receiving the object in any one of the transit locations is a qualified as a match to an expected action. As another example, the "received shipment" event may be communicated to a warehouse management system, so that the warehouse system may then update its inventory record, and, additionally or alternatively, the "received shipment" event may be communicated to the manufacture's management system, so that a status of the object may be changed to "shipped."

When the activity handler 418 fails to find an expected action that could match the received event, the activity handler may treat the received event as unexpected or an exception (516). The activity handler 414 may then, for example, send an alert to a user interface of a local operator, notifying the local operator of the unexpected action, or may trigger another exception handling system to report the unexpected action. On the other hand, if the event is also received by other activity handlers, then the activity handler 414 may determine that it is possible that the other handler(s) are responsible for processing the event(s), and may not issue an alarm.

As just described, the activity handler 414 and the rule engine 416 thus serve at least two primary and overlapping functions. First, they determine whether a received event matches an expected action, i.e., whether the event that just happened was supposed (expected) to happen. Second, if the event was supposed to happen, then the rule engine 416 determines whether any further action is supposed to take place in response to the expected action, and, if so, triggers the further action accordingly (or, alternatively, triggers an error alert).

Figure 6:
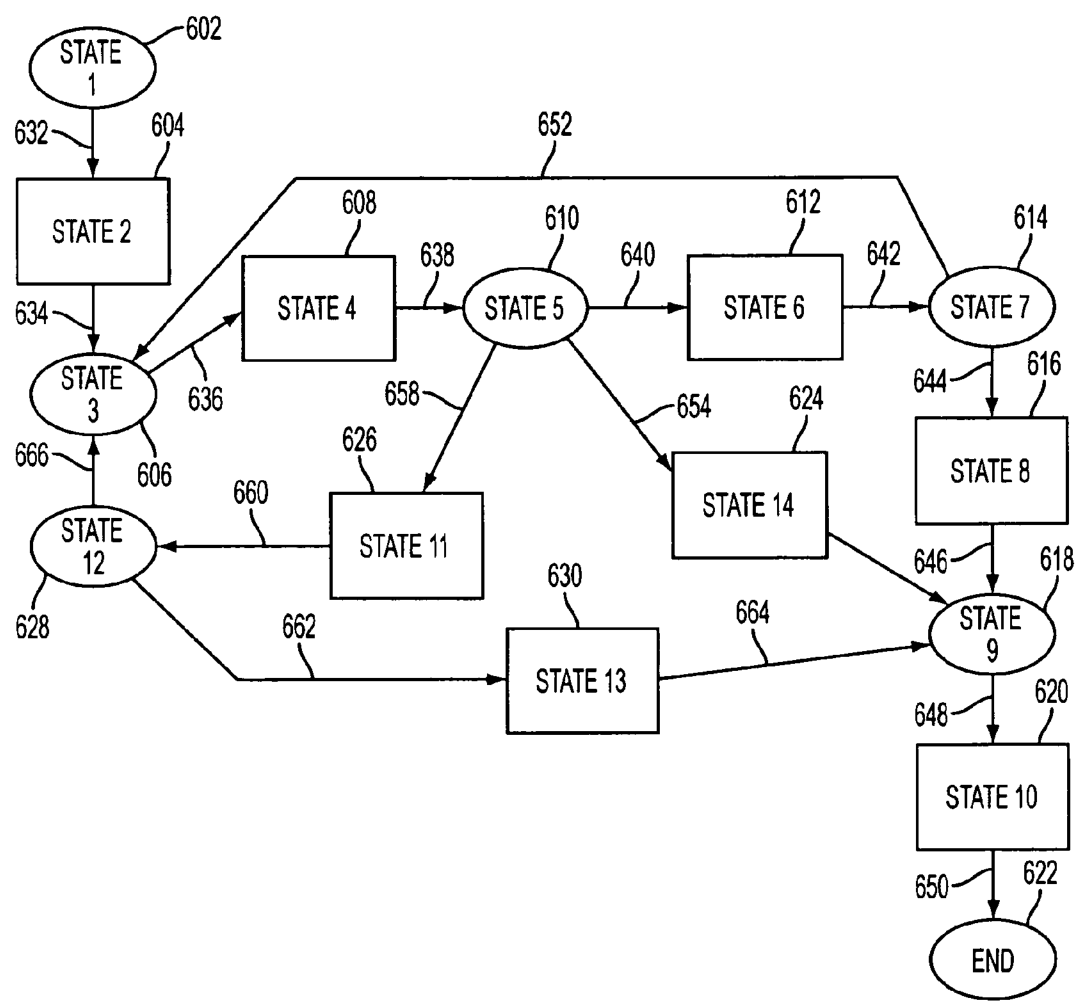
FIG. 6 is a block diagram of a business process model used in the process of FIG. 5.

FIG. 6 is a block diagram of a business process model 600 used in the process of FIG. 5 and associated with a physical object. As referenced above, the business process model 600 includes a sequence of states of an object and the event(s) that triggers any changes from one state to the next.

In FIG. 6, elements 602-630 represent a state that an object is in, or has been in at some point in the past, or may be in at some future time. More specifically, each rectangle-shaped element may represent a state that is part of a business process that is associated with the object, and/or with a lifecycle (or portion thereof) of the object. For example, "state 4" 608 may represent a state of "object in transit." Oval-shaped objects represent states for which the business process model contemplates that there may be multiple possibilities for events following therefrom, where such events are represented by multiple ones of transitional arrows 632-666 that links the various states 602-630.

As a result, FIG. 6 conceptually illustrates the features discussed above with respect to FIGS. 4 and 5, as to how the activity handlers 414/416 manage an object through multiple points along its timeline, and achieve the referenced functionality of first matching an event with an expected action, and then determining which future events should be triggered thereafter.

For example, the state 608 may represent a state of "in transit," so that the state 608 represents a current state 426 of the relevant object, and the event 638 represents an expected event of reading an RFID tag of the object at a reader located at a destination warehouse, while the state 610 represents an expected state of "at warehouse." Thus, if the activity handler 414 receives the event 638 at some point after the object has entered the state 608 "in transit," then the activity handler may use the appropriate rule engine/rule set to determine that the event 638 matches the expected action (event) of transporting the object to a specified warehouse. The rules in the rule set 620 may make such a determination based on, for example, a location of the relevant reader from which the event was generated, or a timing of the event, or an identify of the object itself.

Assuming the event matches the expected event (if not, an alarm may be triggered, or a decision to take not action may be made), then the activity handler switches a current state of the object to the state 610, and switches the state 608 to a history, or past, state. The activity handler then determines which of the possible, expected events 640, 654, and 658 should be experienced by object next.

Or, in other implementations, an operator may determine which state 612, 624, or 626 will be experienced next, and then the activity handler may simply wait for one of the events 640, 654, or 658 to actually happen, and then select one of the states 612, 624, or 626, accordingly. In still other implementations, the operator may notify the activity handler 414 which of the states 612, 624, or 626 is to be expected, so that the activity handler 414 can determine when the corresponding event occurs.

It should be evident from FIG. 6 that there are many possible routes or timelines that a particular object may follow through the business process model 600, depending on, for example, how the rules are implemented. Further, an object's progression along a particular route may depend on its route to date, and also may depend on one or more future possible routes (states). As a result, by adding, removing, or modifying the rule sets 420 and 422, a route or lifecycle of an object may easily be managed in a number of situations and scenarios.

For example, FIG. 6 may represent a lifecycle for a package of meat or other agricultural product that is being shipped from a farm to a retail grocery store. The state 610 may represent a state of "at warehouse A," while the states of 612, 624, and 626 may represent states of "receiving facility in country A," "receiving facility in country B," and "receiving facility in country C."

The rules may be consulted to determine which of the states 612, 624, or 626 are possible, so that, for example, a corresponding event 640, 654, or 658 may be expected to be received. For example, agricultural restrictions may apply in some countries regarding limitations on importing meat or other agricultural products. As a result, if the activity handler 414 determines at the state 610 that the meat shipment originated from country Z in state 602, then this determination may apply a rule which restricts shipment into countries A and B (i.e., which limits a future action to the state 626, so that the event 658 becomes an expected event at a related auto-id node. Similar comments apply to rules which may be based on "future" states, such as a final destination state (e.g., retail grocery store) 622.

It should be understood that such rules regarding restrictions of shipments or other events/states may be dynamically modified. For example, if agricultural restrictions are lifted by an act of government of a particular country, then the rules may be modified to allow meat shipments to that country where none was previously allowed. However, in so doing, the basic architecture of the business process model and the auto-id node 400 is maintained. Similarly, more rules may be added in the business process for special handling instructions, or other additions/modification to the original business process and lifecycle of the specific product.

It should be understood that such rules may be added locally to an auto-id node, which enables the flexible adjustments of a common business rule to handle specific local business logic. This architecture may help the enterprise system, for example, to apply organization wide policies, while allowing variations at lower levels, e.g., a local auto-id level. This architecture also may help the enterprise system not to be burdened with the detailed management of the low level, local specific business process (represented in the format, for example, of rules or rule sets), even though the enterprise system may, if necessary, obtain information regarding the rule sets or other operations of the auto-id node(s). The architecture also provides an enterprise system with a scalable platform for growing the business process.

As another example of the flexibility of the architecture of the auto-id node of FIG. 4, it should be understood that the architecture allows for specific, time-limited application of desired rules, within the overall context of a business process. For example, in the example referenced above regarding a Christmas display during Christmas season, the rule set 422 may be uploaded to an auto-id node in a retail store's Christmas display that includes objects for sale.

The rule set may include a rule 422 that when the contents (objects) of the display drop below some selected amount, then additional units of the object should automatically be re-order from a particular manufacturer. After Christmas, this rule may be deactivated, or be replaced by a new rule that specifies a different inventory level to trigger a new order.

In the architecture of the activity and process management module 410, then, each removal of an object from the display may trigger an event from an associated RFID reader, and the event may be matched with an inventory activity handler, having the rule(s) associated with that reader. The rules then compare the remaining inventory with the "trigger" amount of inventory, and, when the "expected event" of less than the specified level of inventory is reached, then the activity handler triggers the order for more of the relevant object(s) of the display.

The architecture of the rule engine allows the rule updates to happen without the disturbance of the auto-id node in processing other events. For example, in a retail system, each promotion or sale event may be represented in a rule set, where new prices for a list of sales object may be determined from the rule(s). In a warehouse management system, seasonal objects' inventory level may be adjusted by applying different rule sets in different times of the year, or in different locations of the warehouse, depending on, for example, a local climate of the warehouse.

It should be understood that the business process model of FIG. 6 is but one representation of a framework for implementing the rules of the activity and process management module 410. Object or device states, and corresponding events, may be formalized according to some other framework, or may be implicit within the rules themselves.

As discussed above, FIG. 4 generally illustrates an architecture for an auto-id node in which different types of activities and associated activity handlers are associated with specialized (types of) rule sets. For example, such an activity handler may be associated with an activity for determining a recall of defective goods, and may contain a rule set for checking whether such goods were ever handled by a particular auto-id node. A generic rule engine may be used to generate specific instantiations to be used with different rule sets for such an activity, and/or while handing different activities.

As a result, a behavior of an auto-id node may be changed by changing the rule set used therein. Such changes may be made dynamically, and are discussed in more detail below with respect to FIGS. 7 and 8.

Figure 7:
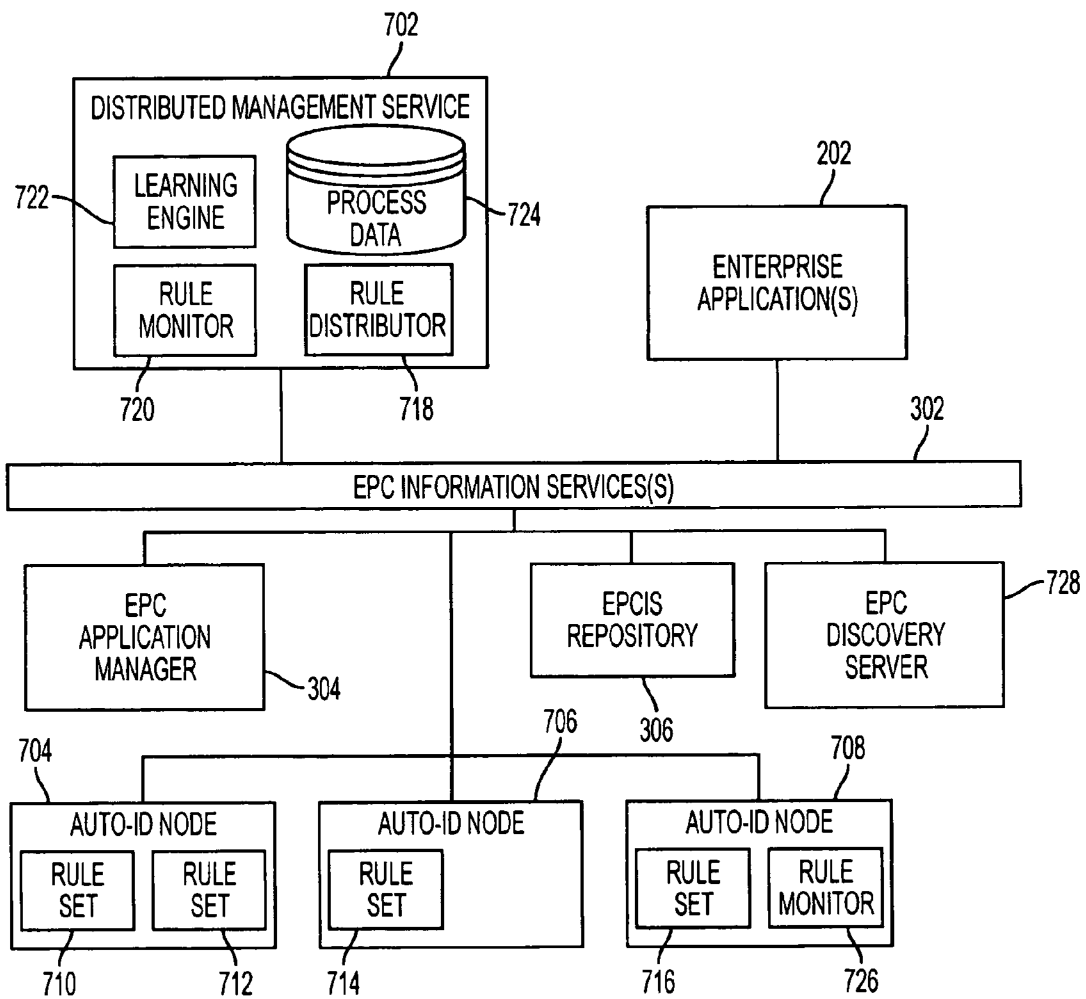
FIG. 7 is a block diagram of a rule discovery service for the auto-id infrastructure of FIGS. 1-4.

FIG. 7 is a block diagram of a rule discovery service for the auto-id infrastructure of FIGS. 1-4. In FIG. 7, a distributed management service 702 is positioned in communication with the EPCIS information services layer 302 of FIG. 3, in order to communicate with auto-id nodes 704, 706, and 708. Of course, the distributed management service 702 may communicate with the auto-id nodes 704-708 directly, or by way of some other mediating layer.

The distributed management service 702 allows for a monitoring and modification of operations of the auto-id nodes 704-708, such that operations of one of the auto-id nodes 704-708 become beneficial to the operations of another one of the auto-id nodes 704-708. For example, if the auto-id nodes 704-708 are each associated with a retail store, then the distributed management service 702 may determine that certain operations and occurrences at the auto-id node 704 are correlated with instances of theft at the retail store associated with the auto-id node 704. Then, the distributed management service 702 may use this information (along with any responsive actions taken at the auto-id node 704 to reduce theft), in order to reduce instances of theft at the retail stores associated with the auto-id nodes 706 and/or 708.

Similarly, the distributed management service 702 may be at a level of the enterprise applications 202. As a result, a user of the enterprise application system 202 may implement a sales promotion at the retail store associated with the auto-id node 704, and the distributed management service 702 may determine or obtain information related to the sales promotion. Then, again, the discovery service may utilize this information to conduct improved sales promotions at the retail stores of auto-id nodes 706 and 708, or at the auto-id node 704, itself.

In providing these and other features, the auto-id nodes 704-708 include rules for processing events that are detected at each of the auto-id nodes 704-708. For example, the auto-id node 704 includes a rule set 710 and a rule set 712, while the auto-id node 706 includes a rule set 714, and the auto-id node 708 includes a rule set 716. As should be understood from the above description of FIGS. 4-6, the various rules may be modular and modifiable, so that the rules may easily be changed in response to changing circumstances.

Many examples of such rules are provided above. Although such examples are provided in the context of FIGS. 4-6, it should be understood that not all of the features of FIGS. 4-6 are required in the context of FIG. 7, and that other features, not explicitly described above, may be added. For example, the auto-id node 704 may or may not include the event message dispatcher 412 or the activity handlers 414, 416. Similarly, data collected with respect to the auto-id nodes 704-708 may be collected using auto-id technology and/or using other environment data collection devices.

Further, an end result of the rules discussed with respect to FIGS. 4-6 was to match detected events with expected events, and/or to determine future actions, based on the match, or lack thereof. Although such functionality may be used in the context of FIG. 7, as described below, the rule sets 710-716 need not match a detected event with an expected event in order for the distributed management service 702 to operate.

Similarly, although the rules may be constructed as business process models, similar to the business process model 600 of FIG. 6, the rules also may be designed in other ways, such as, for example, combinations of conditional clauses for governing responses of the rules' respective auto-id node(s). As another example, the rules may be designed as a classification scheme and/or decision tree, perhaps according to pre-defined categories of rules, events, or physical items.

Within the distributed management service 702, then, a rule distributor is used to propagate rules throughout the auto-id node infrastructure, e.g., between the auto-id nodes 704-708. In some implementations, the rules may be designed as the modular set 710 of rules by, for example, a user of the enterprise application system 202, with respect to a particular auto-id node, e.g., the auto-id node 704. For example, if the auto-id node 704 is associated with a retail store, the rules may govern stocking or inventory procedures, sales procedures, particular sales promotions, theft deterrence programs, operational procedures for running the retail store, or any combination of these and other business processes executed at the retail store. If the auto-id node 704 is associated with a warehouse, the rules may govern ingoing or outgoing shipment events, shelving procedures, "picking" procedures for selecting items for shipment, or other business processes of the warehouse.

In other implementations, the rules may be determined by a rule monitor 720 that is located at the distributed management service 702. For example, the rule monitor may simply monitor operations of the auto-id node 706. Over time, a learning engine 722 may be used to formulate rules that should apply to the operations, perhaps with the assistance of a human operator.

For example, if the auto-id node 706 is associated with a retail store, then the rule monitor 720 may monitor the auto-id node 706 and determine that a particular item is being sold out on a regular basis, and that there is an unacceptable (defined) period of time between the selling out of the item and a re-ordering of the item. In this case, the learning engine 722 may formulate a rule that the item should automatically be re-ordered upon some designated event, e.g., upon a sale of the item such that only twenty (or some other number) units of the items remain to be sold, or a rule that the item should be ordered from a supplier with a faster delivery time, even if that supplier is more expensive than an original supplier. Once formulate, such rules may be propagated to the auto-id node 706 by the rule distributor 718 as the rule set 714.

However the rule set 714 is generated, determined, or designed, the rule set 714 may be validated before (or after) distribution to the auto-id node 706. For example, the learning engine 722 may perform validation of the rule set 722, and/or the rule distributor may perform the validation. In other examples, the auto-id node 706 itself may have the functionality of validating a rule set. In instances where the rule set 714 is expressed, wholly or partially, as a business process model, such as the business process model 600 of FIG. 6, then existing validation techniques may be used for business process models. More generally, validation may be performed to ensure that no conflicts or other unacceptable outcomes are reached.

During operation, the rule set 714 may then be monitored by the rule monitor 720. In particular, process data related to operations of the rule set 714 may be collected by the rule monitor 720 and stored within a process data database or memory 724. Over time, the learning engine 722 may make determinations regarding a success level of the rule set 722 at the auto-id node 706.

For example, for a theft-deterrence rule set, the learning engine 722 may analyze theft reports that are obtained from an external source, or that are obtained or derived from or by the rule set 714 itself. Then, to the extent that the rule set 706 is deficient, then the learning engine 722 and the rule distributor 718 may modify the rule set 714, and/or distribute a new version of the rule set 714, or a new rule set entirely.

If the rule set is successful, however, then the distributed management service 702, and, particularly, the rule distributor 718, may duplicate the rule set 714 for distribution to other, similarly-situated auto-id nodes. In FIG. 7, for example, it may be that the rule set 712 is a duplicate of the rule set 714, that was distributed to the auto-id node 704 from the auto-id node 706 by the rule distributor 718, after a determination that the rule set 714 was useful and successful at the auto-id node 706.

Many other variations, features, and examples of the auto-id system of FIG. 7 may be implemented. For example, although the rule monitor 720 is illustrated as part of the distributed management service 702, it should be understood that rules and operations of auto-id nodes may be implemented at the auto-id nodes themselves, such as, for example, the rule monitor 726 of the auto-id node 708. In this case, the rule monitor 708 may monitor location operations of the auto-id node 708, and may only forward those operations or rules that are determined to be potentially useful to the distributed management service 702, and/or to another auto-id node. In this way, operations of the distributed management service 702, and an amount of data processed, may be limited.

As shown in FIG. 7, the distributed management service 702 is interoperable with existing auto-id tracking systems, such as, for example, the EPCIS architecture illustrated in FIGS. 3 and 7. For example, an EPC discover server 728 may be intended to store data regarding movement and events of physical items, and related information. However, as a practical matter, it may not be feasible for the EPC discover server 728 to track all desired data in a sufficiently timely manner. As a result, components of the auto-id system(s) described herein may benefit from tracking only that information that is useful to the components themselves.

For example, the distributed management service 702 may track real-time data much more quickly than the EPC discover server 728 itself. Nonetheless, the distributed management service 702 may make use of the EPC discover server 728, for example, to obtain data regarding selected physical items. For example, the learning engine 722 may use such data to validate rule sets, or to design or update rule sets.

Conversely, the EPC discover server 728 may benefit from obtaining data from the distributed management service 702, rather than directly from a data source (e.g., device or auto-id node) or from the EPCIS repository 306. In this case, or generally, it should be understood that there may be multiple ones of the distributed management service 702 that are in communication with the information services layer 302, and thereby with the EPC discover server 728.

In some implementations of the distributed management service 702, the generation of rules and the using of the rules may be separated into two different procedures, examples of which are discussed herein. As one example of the generation of rules, a sample data set may be used for generating a classification scheme(s) and/or deterministic rule sets. Then, as the EPC repository 306 or the EPC discover server 728 may collect data records and also a deterministic value of the data records, the learning engine 722 in the distributed management service may then generate the rule set, using information from the repository 306 and/or discovery server 728.

In some implementations of the distributed management service 702, there may be at least two levels of operations involved the rule set(s), i.e., the activities in an auto-id node, and operations that require that the activities cross the auto-id nodes in a distributed auto-id infrastructure environment. For the activities in an auto-id node, the rules may be pushed into an auto-id node, such as, in the example just given, rules for detecting whether a physical object is one that need to be recalled.

For the activities that require the operations cross the infrastructure (e.g., a supply chain network), the rules may be handled by the distributed management service system 702. For example, if a particular physical object occurs in multiple auto-id node sites in a small time window, the distributed management service 702 may determine a high likelihood that the object is a counterfeit object.

In some implementations, the rule distributor 718 compares the profiles of each auto-id node 704-708. If portions of profiles of two of the auto-id nodes are similar, then the rule distributor 718 may redistribute the rule set to those auto-id nodes. For example, if a physical object is involved in a special promotion and is associated with a high counterfeit rate, then all the auto-id nodes that deal with this promotion may receive the same or similar rule set(s) for detecting (and reacting to) this particular counterfeit object.

Figure 8:
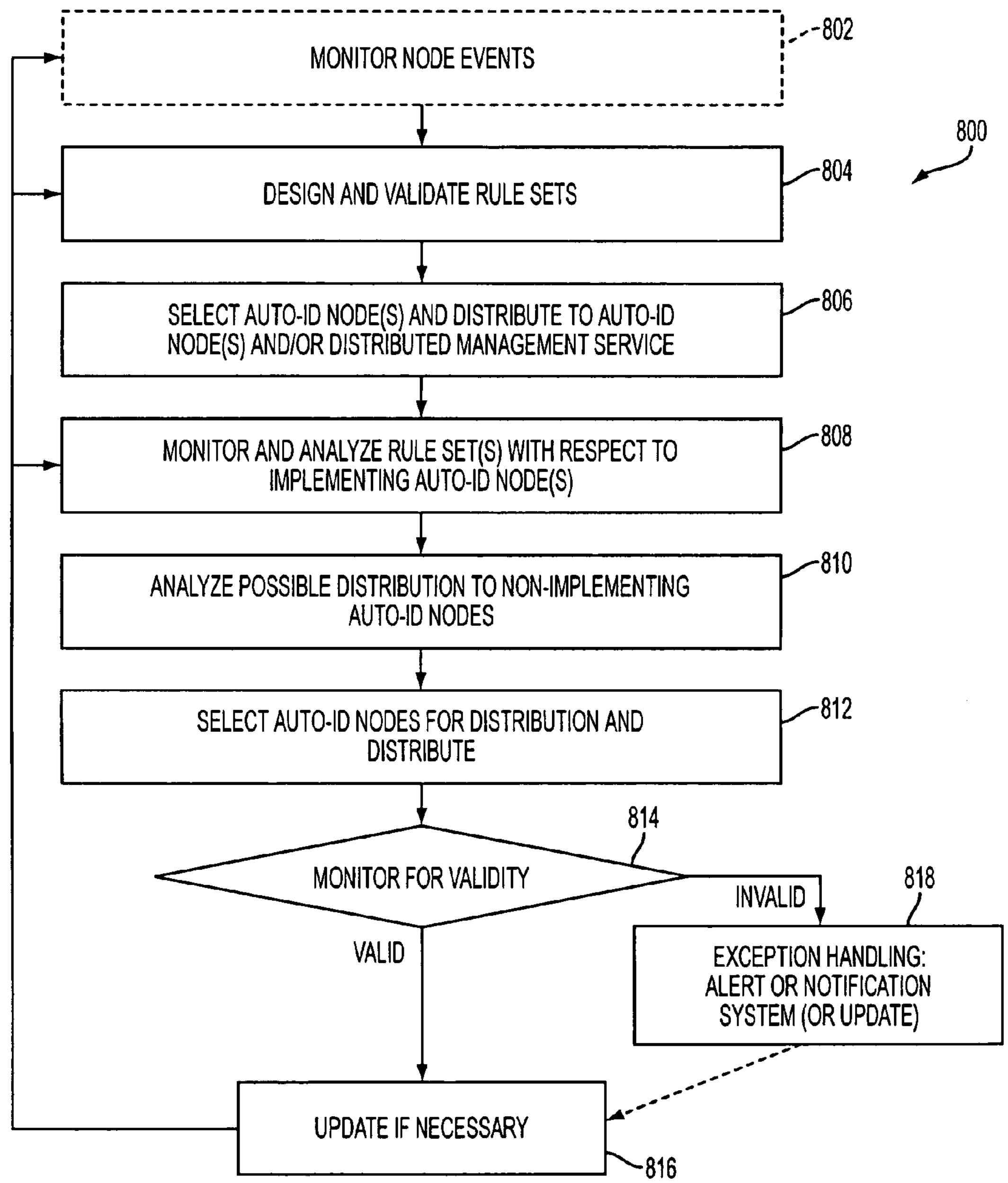
FIG. 8 is a flowchart illustrating an operation of the distributed management service of FIG. 7.

FIG. 8 is a flowchart illustrating an operation 800 of the distributed management service 702 of FIG. 7. In FIG. 8, the process 800 may begin with a monitoring of events at one or more of the auto-id nodes 704-708 (802).

In particular, the rule monitor 720 and/or 726 may be operable to conduct complex queries directly to one or more of the auto-id nodes 704-708. For example, the rule monitor 720 may query the auto-id node 706 regarding events that occurred at a retail store associated with the auto-id node 706, such as, "how many units of item A sold in the last week?" The results of such queries may be obtained by the rule monitor 720.

In response to the query results, or as an initial matter, rule sets may be designed and validated (804). As an example of the latter, rules may be designed with respect to a particular sales promotion. For example, rules may be designed for a sale of a particular item in which a price discount is determined, a multi-item packaging arrangement is defined (e.g., a trilogy of books or a DVD set), a time limit for the promotion is defined, and/or a coupon requirement is defined. Such rules may thus be formed without any particular input from any auto-id node, but may just be designed as a business decision to increase sales. Of course, such rules also may be designed, either in whole or in part, as part of the monitoring processes just described.

Once designed and validated, the rules may be distributed to one or more of the auto-id nodes (806). In some implementations, rules may be defined within, based on, or obtained from, the EPCIS architecture, e.g., at the EPC application manager and/or the repository 306, and then sent to the distributed management service 702 for distribution to the auto-id node(s).

In one implementation, auto-id nodes may be selected according to a number of different types of selection criteria. For example, an auto-id node may have had success with an item during a time when the item was popular (e.g., a particular brand of clothing that sold well last year). Thus, if another brand of the same type of clothing is determined to be popular in the given year, then the auto-id node may be selected for a sales promotion of the latest brand.

Other selection criteria may be used in determining auto-id nodes for distribution. Further, it should be understood that if the node events of a particular auto-id node were monitored for determining the rules in the first place (802), then that auto-id node may be automatically selected for distribution.

The distributed management service 702 may monitor the auto-id nodes that receive the rules for implementation thereof (808). For example, the distributed management service 702 may determine whether a sales promotion at an auto-id node is successful, based on, for example, a number of units sold during a Christmas promotion. In making such determinations, the rule monitor 720 may access the process data database 724 to determine how many units, or similar units, were sold during the previous Christmas season, and/or what the profit margin was on those units.

Then, the distributed management service 702 may analyze the rules for possible distribution to auto-id nodes that do not currently have those specific rules (810), and distribute the rules accordingly (812). For example, the distributed management service 702 may analyze whether a non-implementing auto-id node has had similar levels of success with sales promotions as an implementing auto-id node.

For instance, if the auto-id node 704 associated with a retail store in Cleveland is implementing a specific rule set for a Christmas sales promotion of an item(s), then the distributed management service 702 may determine that the 706 auto-id node in Indianapolis has had similar levels of success with past (similar) promotions, while the auto-id node 708 in Los Angeles had diverging levels of success with such promotions. Therefore, the rules may be distributed to the auto-id node 706, but not to the auto-id node 708.

Of course, other criteria besides location may be used to determine rule distribution. For example, such distribution criteria might include the type of items being sold, a price of the item, a population demographic describing purchasers of the items, a demographic of general purchasers of a particular retail store, or many other criteria. Further, distribution criteria may vary according to the type of site associated with the auto-id nodes, so that distribution criteria may vary across, for example, warehouse sites, distribution centers, purchasing sites, and other sites. Moreover, distribution criteria may be applied across these types of sites, and need not be restricted to particular categories of sites, such as, for example, retail stores.

Once the rules are distributed to the auto-id nodes, then the distributed management service 702 may monitor the auto-id nodes (e.g., events detected at the auto-id nodes) and rules to ensure that the rules remain valid (814). If so, the rules may be updated (816), if necessary, or, if not, may be discontinued and/or an alert generated. In the latter case, an update may be sufficient to render the rules valid again (816).

For example, if the rules govern a Christmas promotion, then the distributed management service 702 may determine that the rules are invalid as of December 26. In this case, the distributed management service 702 may automatically discontinue the promotion (and remove the rules) on December 26, or may update the rules to reflect a non-Christmas sales approach.

As another example, it may be that rules designed at the distributed management service 702 may turn out to have an internal inconsistency that was not anticipated at design time. In this case, the auto-id node processing the rules may reach a "dead-end" for processing, and an alert may be generated.

As shown, the process of FIG. 8 may be iterative, so that once rules are distributed and implemented, the process may continue with, for example, a return to a general monitoring of nod events (802), a further design and validation of the rules, or new rules (804), and/or a monitoring of additional, non-implementing auto-id nodes (808) for possible distribution of rules thereto. By continuing in the ongoing and iterative manner, the distributed management system 702, and particularly the learning engine 722, may, over time, develop and improve rule sets, as well as monitoring, selection, and distribution criteria for propagating the rules through the auto-id system.

As described above, operational rules and criteria may be defined with respect to an auto-id node so as to govern a behavior of the auto-id node, and thereby of an auto-id system, as a whole. In governing the behavior, however, a general architecture of the auto-id node and system is maintained. As a result, the auto-id node and system are very flexible in implementing business processes across a range of enterprise endeavors.

The rules may be expressed as modular rule sets, that may be tested separately and distributed within and among the auto-id nodes. As a result, the rules may be dynamically modified, or removed entirely, without affecting other operations of the auto-id node(s). Further, any result of the application(s) of the rules may be saved as such, and may therefore be useful in implementing the rules later, or in implementing different rules.

Also, because the auto-id system may be widely distributed, and may include multiple auto-id nodes, the distributed management system 702 may make use of multi-site information in formulating or implementing rules. For example, if the auto-id nodes 704 and 706 routinely ship or distribute items to/between one another, then rules may be formulated at both sites that govern or rely on such information.

A number of implementations have been described. Nevertheless, it will be understood that various modifications may be made. For example, the various elements of the distributed management system 702 may have overlapping functionality, or may be implemented in whole or in part at a site of a particular auto-id node. Accordingly, other implementations are within the scope of the following claims.

What is claimed is:

1. A computer-implemented method comprising:

transmitting a query to auto-id nodes, each auto-id node being located at a site of an enterprise and including a tracking device that is operable to track events occurring to physical objects processed by the enterprise at the site, the query requesting past event data describing the events occurring to the physical objects at the respective sites within a specified past period of time;

receiving the requested event data from the auto-id nodes;

generating a rule set based on the requested event data, each rule, when invoked by a particular auto-id node, specifying actions to be taken by the enterprise in response to a particular condition or circumstance detected by the particular auto-id node while processing the physical objects at the site associated with the particular auto-id node;

classifying the auto-id nodes into an implementing subset of auto-id nodes and a non-implementing subset of the auto-id nodes, based on selection criteria;

distributing the rule set to the implementing subset of the auto-id nodes for invocation;

monitoring the implementing subset of the auto-id nodes for post-distribution event data describing the events occurring to the physical objects at the implementing subset of the auto-id nodes after the rule set is invoked by the implementing subset of the auto-id nodes;

comparing the post-distribution event data with the past event data;

determining that the actions taken by the enterprise while processing the physical objects at the sites associated with the implementing subset of the auto-id nodes were successful based on comparing the post-distribution event data with the past event data; and distributing the validated rules to the non-implementing subset of the auto-id nodes when determining that the actions taken by the enterprise were successful.

2. The method of claim 1, wherein the past event data describes a quantity of units sold by the enterprise.

3. The method of claim 1, wherein the rule set comprises rules defining:

a price discount for a particular item, a multi-item packaging arrangement, a promotion time limit, and a coupon requirement.

4. The method of claim 1, wherein the selection criteria are used to classify the auto-id nodes into select implementing subset of the auto-id nodes and the non-implementing subset of the auto-id nodes based on past success of the implementing subset with respect to a particular item or a particular brand of item.

5. The method of claim 1, wherein:

the rule set is distributed to the implementing subset of the auto-id nodes only, the event data is received from the implementing subset of the auto-id nodes only, the selection criteria are used to automatically classify the auto-id nodes into select the implementing subset of the auto-id nodes and the non-implementing subset of the auto-id nodes based on the event data being received from the implementing subset of the auto-id nodes only, and the implementing subset of the auto-id nodes comprises fewer than all of the auto-id nodes.

6. The method of claim 1, wherein the selection criteria comprise: a type of item being sold, a price of the item, a population demographic describing purchasers of the item, or a demographic of general purchasers of a particular retail store.

7. The method of claim 1, further comprising iteratively determining whether the rule set distributed to the non-implementing subset of the auto-id nodes remains valid.

8. A computer-readable medium encoded with a computer program comprising instructions that, when executed, operate to cause a computer to perform operations comprising:

transmitting a query to auto-id nodes, each auto-id node being located at a site of an enterprise and including a tracking device that is operable to track events occurring to physical objects processed by the enterprise at the site, the query requesting past event data describing the events occurring to the physical objects at the respective sites within a specified past period of time;

receiving the requested event data from the auto-id nodes;

generating a rule set based on the requested event data, each rule, when invoked by a particular auto-id node, specifying actions to be taken by the enterprise in response to a particular condition or circumstance detected by the particular auto-id node while processing the physical objects at the site associated with the particular auto-id node;

classifying the auto-id nodes into an implementing subset of auto-id nodes and a non-implementing subset of the auto-id nodes, based on selection criteria;

distributing the rule set to the implementing subset of the auto-id nodes for invocation;

monitoring the implementing subset of the auto-id nodes for post-distribution event data describing the events occurring to the physical objects at the implementing subset of the auto-id nodes after the rule set is invoked by the implementing subset of the auto-id nodes;

comparing the post-distribution event data with the past event data;

determining that the actions taken by the enterprise while processing the physical objects at the sites associated with the implementing subset of the auto-id nodes were successful based on comparing the post-distribution event data with the past event data; and distributing the validated rules to the non-implementing subset of the auto-id nodes when determining that the actions taken by the enterprise were successful.

9. The computer-readable medium of claim 8, wherein the event data describes a quantity of units sold by the enterprise.

10. The computer-readable medium of claim 8, wherein the rule set comprises rules defining:

a price discount for a particular item, a multi-item packaging arrangement, a promotion time limit, and a coupon requirement.

11. The computer-readable medium of claim 8, wherein the selection criteria are used to classify the auto-id nodes into select implementing subset of the auto-id nodes and the non-implementing subset of the auto-id nodes based on past success of the implementing subset with respect to a particular item or a particular brand of item.

12. The computer-readable medium of claim 8, wherein:

the rule set is distributed to the implementing subset of the auto-id nodes only, the event data is received from the implementing subset of the auto-id nodes only, the selection criteria are used to automatically classify the auto-id nodes into the implementing subset of the auto-id nodes and the non-implementing subset of the auto-id nodes based on the event data being received from the implementing subset of the auto-id nodes only, and the implementing subset of the auto-id nodes comprises fewer than all of the auto-id nodes.

13. The computer-readable medium of claim 8, wherein the operations further comprise iteratively determining whether the rule set distributed to the non-implementing subset of the auto-id nodes remains valid.

14. The computer-readable medium of claim 8, wherein the selection criteria comprise: a type of item being sold, a price of the item, a population demographic describing purchasers of the item, or a demographic of general purchasers of a particular retail store.

15. A system comprising:

one or more computers; and a computer-readable medium coupled to the one or more computers having instructions stored thereon which, when executed by the one or more computers, cause the one or more computers to perform operations comprising:

transmitting a query to auto-id nodes, each auto-id node being located at a site of an enterprise and including a tracking device that is operable to track events occurring to physical objects processed by the enterprise at the site, the query requesting past event data describing the events occurring to the physical objects at the respective sites within a specified past period of time, receiving the requested event data from the auto-id nodes, generating a rule set based on the requested event data, each rule, when invoked by a particular auto-id node, specifying actions to be taken by the enterprise in response to a particular condition or circumstance detected by the particular auto-id node while processing the physical objects at the site associated with the particular auto-id node, classifying the auto-id nodes into an implementing subset of auto-id nodes and a non-implementing subset of the auto-id nodes, based on selection criteria, distributing the rule set to the implementing subset of the auto-id nodes for invocation, monitoring the implementing subset of the auto-id nodes for post-distribution event data describing the events occurring to the physical objects at the implementing subset of the auto-id nodes after the rule set is invoked by the implementing subset of the auto-id nodes, comparing the post-distribution event data with the past event data, determining that the actions taken by the enterprise while processing the physical objects at the sites associated with the implementing subset of the auto-id nodes were successful based on comparing the post-distribution event data with the past event data, and distributing the validated rules to the non-implementing subset of the auto-id nodes when determining that the actions taken by the enterprise were successful.

16. The system of claim 15, wherein the event data describes a quantity of units sold by the enterprise.

17. The system of claim 15, wherein the rule set comprises rules defining:

a price discount for a particular item, a multi-item packaging arrangement, a promotion time limit, and a coupon requirement.

18. The system of claim 15, wherein the selection criteria are used to classify the auto-id nodes into select implementing subset of the auto-id nodes and the non-implementing subset of the auto-id nodes based on past success of the implementing subset with respect to a particular item or a particular brand of item.

19. The system of claim 15, wherein:

the rule set is distributed to the implementing subset of the auto-id nodes only, the event data is received from the implementing subset of the auto-id nodes only, the selection criteria are used to automatically classify the auto-id nodes into the implementing subset of the auto-id nodes and the non-implementing subset of the auto-id nodes based on the event data being received from the implementing subset of the auto-id nodes only, and the implementing subset of the auto-id nodes comprises fewer than all of the auto-id nodes.

20. The system of claim 15, wherein the operations further comprise iteratively determining whether the rule set distributed to the non-implementing subset of the auto-id nodes remains valid.

21. The system of claim 15, wherein the selection criteria comprise: a type of item being sold, a price of the item, a population demographic describing purchasers of the item, or a demographic of general purchasers of a particular retail store.

* * * * *